United States Patent [19]

O'Lenick, Jr.

[11] Patent Number: 5,180,843
[45] Date of Patent: Jan. 19, 1993

[54] TERMINAL SUBSTITUTED SILICONE FATTY ESTERS

[76] Inventor: Anthony J. O'Lenick, Jr., 743 Ridgeview Dr., Norcross, Ga. 30247

[21] Appl. No.: 760,760

[22] Filed: Sep. 16, 1991

Related U.S. Application Data

[63] Continuation-in-part of Ser. No. 539,558, Jun. 18, 1990, Pat. No. 5,136,063.

[51] Int. Cl.$^5$ .............. C09F 5/08; C09F 7/10; C07F 7/08
[52] U.S. Cl. ................................ 556/77
[58] Field of Search .......................... 554/77

[56] References Cited

U.S. PATENT DOCUMENTS

| | | | |
|---|---|---|---|
| 3,402,192 | 9/1968 | Haluska | 554/77 X |
| 3,859,321 | 1/1975 | Traver | 554/77 X |
| 3,965,150 | 6/1976 | Moeller | 554/77 X |
| 4,246,423 | 1/1981 | Martin | 554/77 X |
| 4,643,850 | 2/1987 | Hülsmann et al. | 554/77 X |

Primary Examiner—Paul F. Shaver

[57] ABSTRACT

The invention relates to a series of novel silicone fatty esters. This class of compounds, provide outstanding softening and lubricaton when applied to textiles and fibers. The compounds of the present invention are prepared by reacting a the terminal hydroxyl group in a silicone polymer with a fatty carboxylic acid, ester or anhydride.

20 Claims, No Drawings

TERMINAL SUBSTITUTED SILICONE FATTY ESTERS

RELATED APPLICATIONS

This application is a continuation in part of copending U.S. application Ser. No. 07/539,558; filed: Jun. 6, 1990, now U.S. Pat. No. 5,136,063.

BACKGROUND OF THE INVENTION

1. Field of the Invention

The present invention relates to a series of novel silicone fatty esters which provide outstanding lubrication, and softening when applied to a variety of fiber substrates. The esterification by which the compounds are prepared involves the reaction of a hydroxyl containing silicone polymer, and a fatty acid, ester or anhydride.

2. Arts and Practices

Silicone compounds have been known to be active at the surface of cellulosic and synthetic fibers as well as paper. They are good nondurable lubricants and are very stable to oxidation, however, their high cost and lack of efficiency at low concentrations as well as low durability have made their acceptance in commercial products quite low.

In addition to their high cost, silicone compounds have little or no solubility in mineral oils, fatty triglycerides and other classical fatty quatarnary compounds used for softening. This has resulted in the inability to prepare stable blends for use as a textile fiber treatment.

In many applications, there is a desire for a more fatty soluble softener. The desired molecule should have the desirable softening and antistatic properties of silicone, yet have compatibility with traditional fatty materials and oils. Even though a textile softener which has both the desirable softening and antistatic properties of silicone as well as compatibility with fatty compounds has been a long felt need, it isn't until the compounds of the present invention that such a system has been attained.

U.S. Pat. No. 3,511,699 to Sterman issued May 12, 1970 teaches that epoxy compounds placed in the silicone backbone by hydrosilation can be cured onto certain fibers to give improved substantivity. The substantivity is based upon the reaction of hydroxyl groups on the cellulosic and the epoxy group in the silicone polymer. The resulting bond is a ether linkage and a new hydroxyl group. While a definite improvement over other compounds the efficiency and durability of the were not good enough to allow for cost effective incorporation of these materials in detergent formulations.

THE INVENTION

OBJECT OF THE INVENTION

It is the object of the present invention to provide novel silicone based fatty ester compounds which are substantive to the surface of a fiber and other textile materials including cellulosic material and have increased solubility in fatty materials including mineral oil, fatty triglycerides and traditional fatty quaternary ammonium compounds. The compounds of the present invention render the lubricity, and hydrophobicity generally seen in silicone compounds, but because they are esterified with fatty groups have greater solubility in hydrocarbon oils as well as fatty materials than the traditional silicone compounds which are insoluble in those materials.

It is another objective of the current invention to provide silicone fatty esters which unlike the compounds disclosed in the prior application have ester groups in the terminal positions on the silicone backbone. These terminal positions have non-hydrolyzable silicone to carbon bonds, not the less stable silicone oxygen carbon bonds.

SUMMARY OF THE INVENTION

The present invention relates to novel silicone fatty ester compounds. The compounds by virtue of the fatty ester group are soluble in fatty and hydrocarbon products, but have many of the functional softening and lubrication properties of silicone. This property makes these materials excellent additives for highly effective surface modifying finishes for fiber and textiles. The compounds of the present invention are substantive to cellulosic and synthetic fibers as well as metal surfaces and plastic polymers.

The compounds of this invention are silicone fatty esters made by the esterification of a fatty acid, ester, or anhydride and a terminal hydroxy containing silicone compound. The silicone compounds of the present invention have silicone carbon bonds which are defined as nonhydrolyzable bonds. The structure, which occurs at both ends of the molecule is as follows;

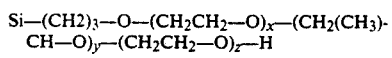

The hydrolyzable silicone bonds have silicone to oxygen to carbon linkages as follows;

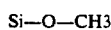

The compounds of the present invention has terminal nonhydrolyzable bonds and conform to the following structure;

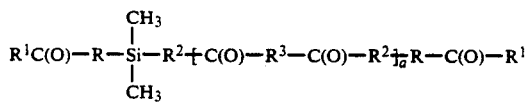

R is

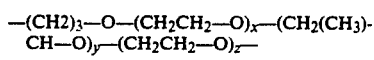

x, y and z are integers independently ranging from 0 to 20;

$R^2$ is

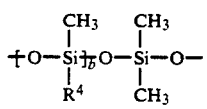

$R^1$ is alkyl having 6 to 30 carbon atoms;
$R^3$ is selected from —$(CH_2)_c$—, or —$(CH_2)_d$—CH=CH—$(CH_2)_e$—;
a is an integer from 0 to 20;
b is an integer from 1 to 200;
c, d and e are independently integers from 1 to 10;
$R^4$ is alkyl having from 1 to 18 carbon units or aryl ($C_6H_5$).

EXAMPLES

The compounds of the present invention are prepared by the reaction of a terminal dimethicone copolyol compound and a fatty acid or polyacid. Examples of suitable reactants are as follows;

| | Formula | Molecular Weight |
|---|---|---|
| Fatty Acids | | |
| Lauric | C12 (Saturated) | 200 |
| Myristic | C14 (Saturated) | 228 |
| Stearic | C18 (Saturated) | 284 |
| Oleic | C18 (unsaturated) | 282 |
| Linoleic | C18 (double unsaturated) | 280 |
| Diacids | | |
| Adipic Acid | HO(O)C(CH2)4C(O)OH | 146 |
| Succinic Acid | HO(O)C(CH2)2C(O)OH | 118 |
| Dodecanedioic Acid | HO(O)C(CH2)10(O)OH | 230 |

Terminal Substituted Dimethicone Copolyol Compounds

Terminal substituted dimethicone copolyol compounds are well known and are marketed in the trade under many names.

The preferred method of placing this type of reactive hydroxyl group into the silicone polymer is by the reaction of terminal silanic hydrogen containing polymer with allyl alcohol alkoxylates. This technology is well known to those skilled in the art and are described in U.S. Pat. No. 4,083,856. These hydroxyl functional silicone compounds are subsequently esterified, by reaction with fatty acids, esters or anhydrides, to make the compounds of the present invention. Compounds suitable for use as reactants in the preparation of the compounds of the present invention conform to the following structure;

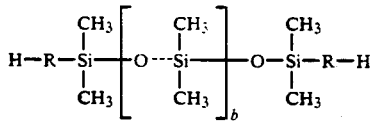

R is $-(CH_2)_3-O-(CH_2CH_2-O)_x-(CH_2(CH_3)-CH-O)_y-(CH_2CH_2-O)_z-$ x, y and z are integers independently ranging from 0 to 20;

b is an integer from 1 to 200.

These materials are available from Siltech Inc. Norcross, Ga. and are marketed under the Siltech T series tradename.

| Name | x | y | z | Molecular Weight |
|---|---|---|---|---|
| Siltech T 701 | 0 | 0 | 0 | 1,000 |
| Siltech T 706 | 5 | 1 | 0 | 6,000 |
| Siltech T 710 | 2 | 1 | 1 | 10,000 |
| Siltech T 750 | 10 | 5 | 10 | 50,000 |
| Siltech T 790 | 20 | 20 | 20 | 86,000 |

General Reaction Conditions

The esterification can be run without catalyst; however, when no catalysts used reaction rates are less efficient. Standard esterification catalysts are generally used at concentrations of between 0.05% to 0.50% with a preferred range of 0.1% to 0.3%. Catalysts which are effective include but are not limited to; sulfuric acid, p-toluene sulfonic acid, methane sulfonic acid, tin metal, zinc metal, titanium metal, organo titianates, organo tin compounds, organo zinc compounds, zinc oxide, magnesium oxide, calcium oxide, etc. The most preferred catalyst is stannous oxylate. The reaction is conducted at between 140 and 240 C. under an inert nitrogen blanket. The nitrogen blanket preserves the color. Preferred temperature range is between 180 and 210 C. Water is removed from the reaction which is done using a nitrogen sparge or vacuum.

The reaction can be run with either a stiochiometric amount of the fatty acid. However, it is recommended that an excess of about 1 to 5% of one acid be employed.

DIESTER EXAMPLES

EXAMPLE 1

Into a suitable reound bottom, three neck flask equipped with a Dean Stark trap, a thermometer and a nitrogen sparge is added 284.0 grams of stearic acid, 0.25% by weight of the total batch charged of stannous oxylate and 5,000 grams of Siltech T 710. The reaction mass is blanketed with nitrogen, and heated to 180 and 200 C. under an inert nitrogen blanket. Once the reaction temperature reaches 120 C. water begins to boil off and is collected in the Dean Stark Trap. Within four to five hours the theoretical water is collected off and the acid value is very low. The product is a white wax and is used without additional purification.

EXAMPLES 2-12

Example 1 is repeated only this time substituting the specified number of grams of the fatty acid specified for the stearic acid and the specified type and number of grams of silanol compound as shown below;

| | Fatty Acid | | Silanol Compound | |
|---|---|---|---|---|
| Example | Type | Grams | Type | Grams |
| 2 | Lauric | 200.0 | T 701 | 500.0 |
| 3 | Myristic | 228.0 | T 701 | 500.0 |
| 4 | Stearic | 284.0 | T 701 | 500.0 |
| 5 | Oleic | 282.0 | T 701 | 500.0 |
| 6 | Lauric | 200.0 | T 706 | 3,000.0 |
| 7 | Myristic | 228.0 | T 706 | 3,000.0 |
| 8 | Stearic | 284.0 | T 706 | 3,000.0 |
| 9 | Myristic | 228.0 | T 710 | 5,000.0 |
| 10 | Stearic | 284.0 | T 710 | 5,000.0 |
| 11 | Oleic | 282.0 | T 750 | 25,000.0 |
| 12 | Stearic | 284.0 | T 790 | 45,000.0 |

POLYMERICS

EXAMPLE 13

Into a suitable round bottom, three neck flask equipped with a Dean Stark trap, a thermometer and a nitrogen sparge is added 254.0 grams of lauric acid, 7.3 grams of adipic acid, 0.25% of total weight of the batch of stannous oxylate and 500 grams of Siltech T 701. The reaction mass is blanketed with nitrogen, and heated to 180 and 200 C. under an inert nitrogen blanket. Once the reaction temperature reaches 120 C. water begins to boil off and is collected in the Dean Stark Trap. Within four to five hours the theoretical water is collected off and the acid value is very low. The product is a white wax and is used without additional purification.

EXAMPLE 14-23

Example 13 is repeated only this time substituting the specified number of grams of the fatty acid specified for the lauric acid and the specified type and number of grams of diacid and the specified type and number of grams of silanol compound as shown below;

| Example | Fatty Acid Type | Grams | Silicone Compound Type | Grams |
|---|---|---|---|---|
| 14 | Myristic | 205.0 | T 701 | 500.0 |
|    | Dodecanedioic | 11.5 | | |
| 15 | Stearic | 227.0 | T 701 | 500.0 |
|    | Adipic | 14.6 | | |
| 16 | Oleic | 197.0 | T 701 | 500.0 |
|    | Succinic | 17.7 | | |
| 17 | Lauric | 190.0 | T 706 | 3,000.0 |
|    | Dodecanedioic | 5.7 | | |
| 18 | Myristic | 216.6 | T 706 | 3,000.0 |
|    | Adipic | 3.7 | | |
| 19 | Stearic | 142.0 | T 706 | 3,000.0 |
|    | Adipic | 36.5 | | |
| 20 | Myristic | 193.8 | T 710 | 5,000.0 |
|    | Succinic | 7.5 | | |
| 21 | Stearic | 197.0 | T 710 | 5,000.0 |
|    | Adipic | 1.9 | | |
| 22 | Oleic | 253.0 | T 750 | 25,000.0 |
|    | Dodecanedioic | 11.5 | | |
| 23 | Stearic | 227.0 | T 790 | 45,000.0 |
|    | Dodecanedioic | 23.0 | | |

APPLICATIONS EXAMPLES

Applications of the Compounds of The Invention

Compounds of this invention were compared to standard compounds commercially available using AATCC Test Method 117-1979. The color fastness heat test uses a 400 F. (205 F.) hot iron which is applied for 60 and 180 seconds. The color is rated on a 1-5 basis for yellowness, (5 being the most yellow).

| Compound | Yellowness |
|---|---|
| Alkaquat T (Imidazoline Quat) | 4 |
| Alkaquat DAET 90 (Amido Quat) | 5 |
| Example # 4 | 1 |
| Example # 19 | 2 |

As can be seen the compounds of the present invention are non-yellowing softeners when compared to standard softeners.

LUBRICATION

FRICTIONAL PROPERTIES

| PRODUCT | DESCRIPTION (70 F) | LUBRICATION DATA[1] Coefficient of Friction FIBER/METAL 100 (m/min.) | 300 (m/min.) |
|---|---|---|---|
| Butyl Stearate | White Liquid | 0.17 | 0.21 |
| Tridecyl Stearate | Clear Liquid | 0.25 | 0.27 |
| Example 4 | White Wax | 0.06 | 0.01 |
| Example 19 | White Wax | 0.07 | 0.02 |
| Ditallowdimethyl benzalkonium chloride | Tan solid | 0.35 | 0.35 |
| Ditridecyl adipate | Clear Amber Liquid | 0.28 | 0.29 |
| Untreated Fiber | | 0.98 | 1.01 |

[1]Rothchild F Meter, Fiber; 150 denier polyester, Temperature; 72 F., Relative humidity; 60%

As can be easily seen the compounds of the present invention are excellent lubricants.

Wet Comb Out Test

A laboratory test is conducted to screen the wet comb properties of a representative member of the family of novel compounds. Hair swatches are purchased from a supply of human hair from the same head. Each test swatch contains 7 grams of hair and is 11 inches in length. The hair is tied tightly 1 inch from one end with string. The swatch is pre-cleaned with a 3% solution of ammonium lauryl sulfate. Subsequently, the swatch is washed under running tap water. The hair is then squeezed out and while still damp dipped into a 200 ml solution of 0.2% active quaternary. Another rinse is made, then the swatch is blotted dry. The swatch is then treated by holding the hair swatch, combing the hair as rapidly as possible while alternating the side of the swatch combed. The time needed to get one smooth free stroke without tangling is recorded. Typical results for the standard quaternary compounds used in hair conditioning (stearyldimethylbenzyl ammonium chloride) range from 12-14 seconds.

| Rinse Conditioner (Wet Comb Out Test) | |
|---|---|
| Product | Time in Seconds |
| Example #10 | 11 |
| Example #22 | 13 |
| Stearyldimethylbenzyl ammonium chloride | 12 |

As can be seen, the compounds of the invention give significant conditioning properties to hair makes them prime candidates for cosmetic as well as textile and other related applications.

I claim:

1. A silicone ester which conforms to the following structure;

$$R^1C(O)-R-\underset{\underset{CH_3}{|}}{\overset{\overset{CH_3}{|}}{Si}}-R^2\text{+}C(O)-R^3-C(O)-R^2\text{+}_{\overline{a}}R-C(O)-R^1$$

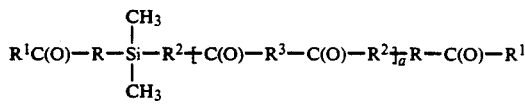

x, y and z are integers independently ranging from 0 to 20;

$R^2$ is

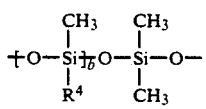

$R^1$ is alkyl having 12 to 18 carbon atoms;
$R^3$ is selected from —$(CH_2)_c$—, or —$(CH_2)_d$—CH=CH—$(CH_2)_e$—;
a is an integer from 0 to 20;
b is an integer from 1 to 200;
c, d and e are independently integers from 1 to 10;
$R^4$ is alkyl having from 1 to 18 carbon units or phenyl.

2. A compound of claim 1 wherein x, y and z are each zero.

3. A compound of claim 1 wherein x, y, and z are each integers ranging from 1 to 10.

4. A compound of claim 1 wherein x, y, and z are each integers ranging from 5 to 8.

5. A compound of claim 1 wherein $R^1$ is alkyl having 14 carbon atoms.

6. A compound of claim 1 wherein $R^1$ is alkyl having 14 to 18 carbon atoms.

7. A compound of claim 1 wherein $R^1$ is alkyl having 18 carbon atoms.

8. A compound of claim 1 wherein $R^1$ is alkyl having 16 carbon atoms.

9. A compound of claim 1 wherein $R^4$ is methyl.

10. A compound of claim 1 wherein $R^4$ is phenyl.

11. A silicone fatty ester compound which is prepared by the esterification of a fatty acid, ester or anhydride having from 12 to 18 carbon atoms with a hydroxy silicone compound conforming to the following structure;

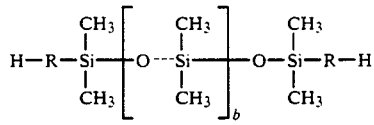

R is —$(CH2)_3$—O—$(CH_2CH_2$—O$)_x$—$(CH_2(CH_3)$-CH—O$)_y$—$(CH_2CH_2$—O$)_z$— x, y and z are integers independently ranging from 0 to 20;

b is an integer from 1 to 200.

12. A compound of claim 11 wherein x, y and z are each zero.

13. A compound of claim 11 wherein x, y, and z are each integers ranging from 1 to 10.

14. A compound of claim 11 wherein x, y, and z are each integers ranging from 5 to 8.

15. A compound of claim 11 wherein $R^1$ is alkyl having 10 to 20 carbon atoms.

16. A compound of claim 11 wherein R is alkyl having 12 to 18 carbon atoms.

17. A compound of claim 11 wherein $R^1$ is alkyl having 18 carbon atoms.

18. A compound of claim 11 wherein $R^1$ is alkyl having 16 carbon atoms.

19. A compound of claim 11 wherein $R^4$ is methyl.

20. A compound of claim 11 wherein $R^4$ is phenyl.

* * * * *